US006782117B2

(12) United States Patent
Wendt

(10) Patent No.: US 6,782,117 B2
(45) Date of Patent: *Aug. 24, 2004

(54) METHOD AND APPARATUS TO DETECT WATERMARK THAT ARE RESISTANT TO ARBITRARY DEFORMATIONS

(75) Inventor: Peter D. Wendt, Mahwah, NJ (US)

(73) Assignees: Sony Corporation (JP); Sony Electronics Inc., Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/383,831

(22) Filed: Mar. 7, 2003

(65) Prior Publication Data
US 2003/0142848 A1 Jul. 31, 2003

Related U.S. Application Data

(63) Continuation of application No. 09/996,648, filed on Nov. 28, 2001, now Pat. No. 6,563,937.

(51) Int. Cl.[7] .............................. H04K 1/00; G06K 9/36
(52) U.S. Cl. ........................ 382/100; 382/291; 382/293
(58) Field of Search ................................ 382/100, 232, 382/284, 286, 291, 293, 295; 380/210, 287, 54; 713/176; 348/461, 463, 465, 466

(56) References Cited

U.S. PATENT DOCUMENTS

| | | | | |
|---|---|---|---|---|
| 6,047,374 A | | 4/2000 | Barton | 713/150 |
| 6,108,434 A | | 8/2000 | Cox et al. | 382/100 |
| 6,282,300 B1 | | 8/2001 | Bloom et al. | 382/100 |
| 6,424,725 B1 | | 7/2002 | Rhoads et al. | 382/100 |
| 6,563,937 B1 | * | 5/2003 | Wendt | 382/100 |

FOREIGN PATENT DOCUMENTS

JP          2001-078010 A       3/2001    .......... H04N/1/387

OTHER PUBLICATIONS

V. Solachidis and I. Pitas, "Circularly Symmetric Watermark Embedding in 2–D DFT Domain," IEEE Article, pp. 3469–3472, 1999.
V. Licks, R. Jordan, "On Digital Image Watermarking Robust To Geometric Transformations," IEEE Article, pp. 690–693, 2000.
Zhicheng Ni, Eric Sung and Yun Q. Shi, "Enhancing Robustness of Digital Watermarking against Geometric Attack Based on Fractal Transform," IEEE Article, pp. 1033–1036, 2000.

(List continued on next page.)

Primary Examiner—Andy Johns
(74) Attorney, Agent, or Firm—Lerner, David, Littenberg Krumholz & Mentlik, LLP

(57) ABSTRACT

A method and/or apparatus for detecting a watermark among a plurality of reproduced frames of data, the reproduced frames of data having been derived from respective original frames of data, includes the capability of: adding at least some of the reproduced frames of data together on a data point-by-data point basis to obtain an aggregate frame of data points; selecting peak data points of the aggregate frame of data points; computing correction information from deviations between the positions of the peak data points within the aggregate frame and expected positions of those peak data points; modifying positions of at least some of the data of at least some of the reproduced frames of data using the correction information such that those reproduced frames of data more closely coincide with respective ones of the original frames of data; and detecting the watermark from among the modified reproduced frames of data.

20 Claims, 9 Drawing Sheets

OTHER PUBLICATIONS

Masoud Alghoniemy and Ahmed H. Tewfik, "Image Watermarking By Moment Invariants," IEEE Article, pp. 73–76, 2000.

Anatasios Tefas and Ioannis Pitas, "Multi–Bit Image Watermarking Robust To Geometric Distortions," IEEE Article, pp. 710–713, 2000.

P. Termont, L. DeStrycker, J. Vandewege, M. Op de Beeck, J. Haitsma, T. Kalker, M. Maes and G. Depovere, "How To Achieve Robustness Against Scaling In A Real–Time Digital Watermarking System For Broadcsat Monitoring," IEEE Article, pp. 407–410, 2000.

Min–Suk Hong, Tae–Yun Chung, Kang–Sea Park and Sang–Hui Park, "A Private/Public Key Watermarking Technique Robust To Spatial Scaling," IEEE Article, pp. 102–103, 1999.

Nopporn Chotikakamthorn and Siriporn Pholsomboon, "Ring–shaped Digital Watermark for Rotated and Scaled Images Using Random–Phase Sinusoidal Function," IEEE Article, pp. 321–325, 2001.

Joseph J.K. O Ruanaidh and Thierry Pun, "Rotation, Scale and Translation Invariant Digital Image Watermarking," IEEE Article, pp. 536–539, 1997.

Ching–Yung Lin, Min Wu, Jeffrey A. Bloom, Ingemar J. Cox, Matt L. Miller and Yui Man Lui, "Rotation, Scale, and Translation Resilient Watermarking for Images," IEEE Article, pp. 767–782, 2001.

Sofia Tsekeridou, Nikos Nikolaidis, Nikos Sidiropoulos and Ioannis Pitas, "Copyright Protection of Still Images Using Self–Similar Chaotic Watermarks," IEEE Article, pp 411–414, 2000.

Chun–Shien Lu and Hong–Yuan Mark Liao, "Video Object–Based Watermarking: A Rotation and Flipping Resilient Scheme," IEEE Article, pp. 483–486, 2001.

Shelby Pereira, Joseph J. K. O Ruanaidh, Frederic Deguillaume, Gabriela Csurka and Thierry Pun, "Template Based Recovery of Fourier–Based Watermarks Using Log–polar and Log–log Maps," IEEE Article, pp. 870–874, 1999.

Shelby Pereira and Thierry Pun, "Transform for Digital Image Watermarking,".

S. Tsekeridou and I. Pitas, "Wavelet–Based Self–Similar Watermarking For Still Images," IEEE Article, pp. I–220–I–223, 2000.

I. Mora–Jimenez and A. Navia–Vazquez, "A New Spread Spectrum Watermarking Method With Self–Synchronization Capabilities," IEEE Article, pp. 415–418, 2000.

Shelby Pereira and Thierry Pun, "Robust Template Matching for Affine Resistant Image Watermarks," IEEE Article, pp. 1123–1129, 2000.

Martin Kutter, "Towards Affine Invariant Image Watermarking Schemes," Swiss Federal Institute of Technology, Lausanne, pp. 1–27.

R. Caldelli, M. Barni, F. Bartolini and A. Piva, "Geometric–Invariant Robust Watermarking Through Constellation Matching In The Frequency Doman," IEEE Article, pp. 65–68, 2000.

I. Burak Ozer, Mahalingam Ramkumar and Ali N. Akansu, "A New Method For Detection Of Watermarks in Geometrically Distorted Images," IEEE Article, pp. 1963–1966, 2000.

D. Delannay and B. Macq, "Generalized 2–D Cyclic Patterns For Secret Watermark Generation," IEEE Article, pp. 77–79, 2000.

H.Z. Hel–Or, Y. Yitzhaki and Y. Hel–Or, "Geometric Hashing Techniques For Watermarking," IEEE Article, pp. 498–501, 2001.

Sviatoslav Voloshynovskiy, Frederic Deguillaume and Thierry Pun, "Multibit Digital Watermarking Robust Against Local Nonlinear Geometrical Distortions," IEEE Article, pp. 999–1002, 2001.

Ross J. Anderson and Fabien A.P. Petitcolas, "Information Hiding An Annotated Bibliography," Computer Laboratory, University of Cambridge, pp. 1–62.

M. Kutter, S.K. Bhattacharjee and T. Ebrahimi, "Towards Second Generation Watermarking Schemes," IEEE Article, pp. 320–323, 1999.

N. Kaewkamnerd and K.R. Rao, "Wavelet Based Watermarking Detection Using Multiresolution Image Registration," IEEE Article, pp. II–171–II–175, 2000.

P. Termont, L. DeStrycker, J. Vandewege, J. Haitsma, T. Kalker, M. Maes, G. Depovere, A. Langell, C. Alm, P. Norman, "Performance Measurements of a Real–time Digital Watermarking System for Broadcast Monitoring," IEEE Article, pp. 220–224, 1999.

Maurice Maes, Ton Kalker, Jaap Haitsma and Geert Depovere, "Exploiting Shift Invariance to Obtain a High Payload in Digital Image Watermarking," IEEE Article, pp. 7–12, 1999.

Jean–Paul Linnartz, Ton Kalker and Jaap Haitsma, "Detecting Electronic Watermarks In Digital Video," Philips Researchpp. 1–4.

Fabien A.P. Petitcolas, Ross J. Anderson and Markus G. Kuhn, "Information Hiding—A Survey," IEEE Article, pp. 1062–1078, 1999.

M. Kutter, Watermarking Resisting to Translation, Rotation, and Scaling, Signal Processing Laboratory, Swiss Federal Institute of Technology.

Braudaway et al., "Automatic recovery of invisible image watermarks from geometrically distorted images," *Proc. SPIE vol. 3971: Security and Watermarking of Multimedia Contents II*, Jan. 2000, pp. 74–81.

Alghoniemy et al., "Geometric Distortion Correction Through Image Normalization," *Proc. IEEE Int. Conf. on Multimedia and Expo 2000*, vol. 3, Jul./Aug. 2000 pp. 1291–1294.

Kusanagi et al., "An Image Correction Scheme for Video Watermarking Extraction," *IEICE Trans. Fundamentals*, vol. E84–A, No. 1, Jan. 2001, pp. 273–280.

Delannay et al., "Compensation of Geometrical Deformations for Watermark Extraction in the Digital Cinema Application," *Proc. SPIE vol. 4314: Security and Watermarking of Multimedia Contents III*, Jan. 2001, pp. 149–157.

Su et al., "Synchronized Detection of the Black–based Watermark with Invisible Grid Embedding," *Proc. SPIE vol. 4314: Security and Watermarking of Multimedia Contents III*, Jan. 2001, pp. 406–417.

Loo et al., "Motion estimation based registration of geometrically distorted images of watermark recovery," *Proc. SPIE vol. 4314: Secirotu amd Watermarking of Multimedia Contents III*, Jan. 2001, pp. 606–617.

Su et al., "A Content–Depending Spatially Localized Video Watermark for Resistance to Collusion and Interpolation Attacks," *IEEE Proc. Int. Conf. on Image Processing*, vol. 1, Oct. 2001, pp. 818–821.

\* cited by examiner

| | | | | | | | |
|---|---|---|---|---|---|---|---|
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |

| | | | | | | | |
|---|---|---|---|---|---|---|---|
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| -1 | -1 | -1 | -1 | 1 | 1 | 1 | 1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |
| 1 | 1 | 1 | 1 | -1 | -1 | -1 | -1 |

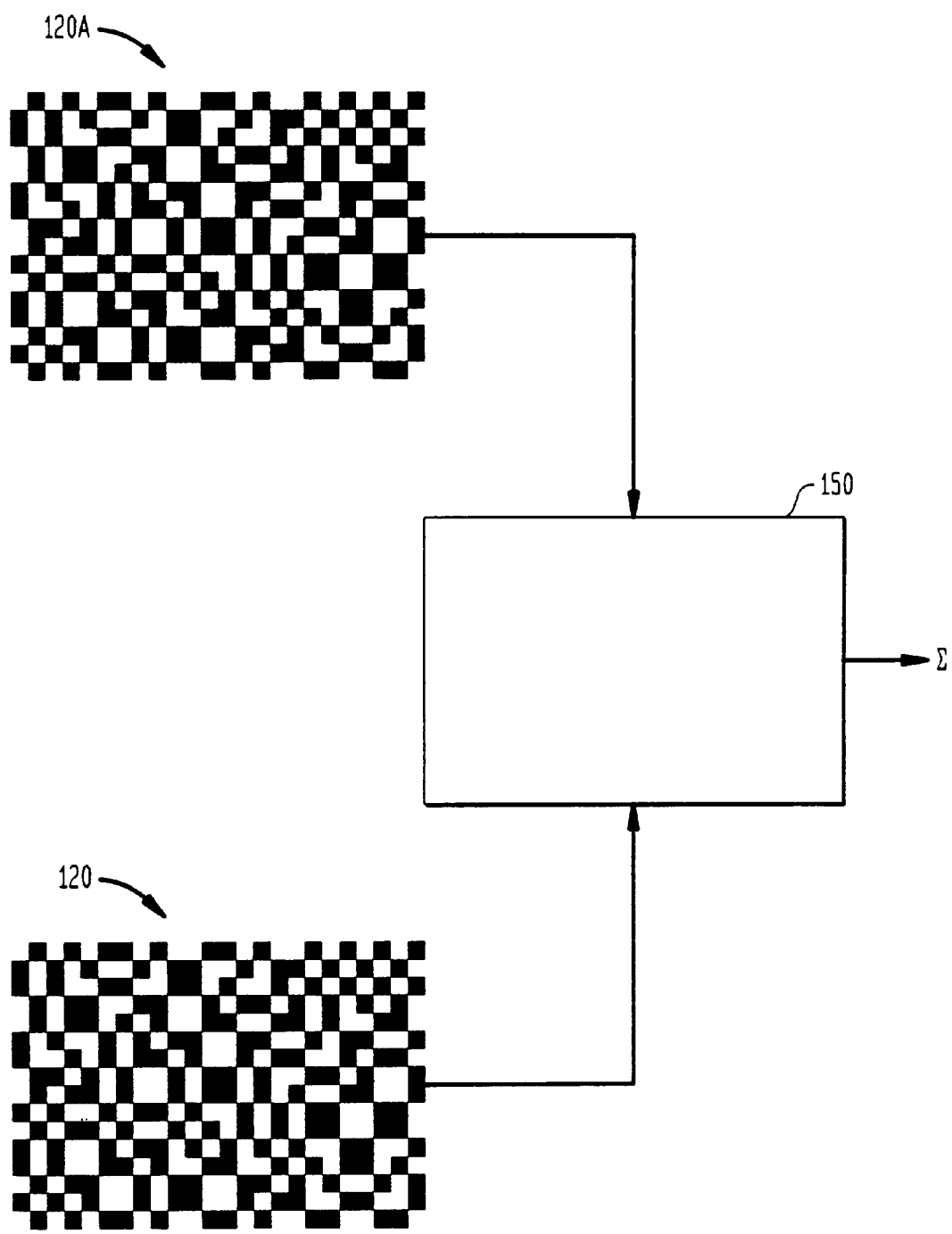

METHOD AND APPARATUS TO DETECT WATERMARK THAT ARE RESISTANT TO ARBITRARY DEFORMATIONS

CROSS-REFERENCE TO RELATED APPLICATIONS

This is a continuation of U.S. patent application Ser. No. 09/996,648, filed Nov. 28, 2001, now U.S. Pat. No. 6,563, 937, entitled METHOD AND APPARATUS TO DETECT WATERMARK THAT ARE RESISTANT TO ARBITRARY DEFORMATIONS, the entire disclosure of which is hereby incorporated by reference.

BACKGROUND OF THE INVENTION

The present invention relates to the detection of one or more watermarks embedded in frames of a moving image and, more particularly, the present invention relates to methods and/or apparatuses for detecting a watermark that are resistant to arbitrary deformation of the watermark.

It is desirable to the publishers of content data, such as movies, video, music, software, and combinations thereof to prevent or deter the pirating of the content data. The use of watermarks has become a popular way of thwarting pirates. A watermark is a set of data containing a hidden message that is embedded in the content data and stored with the content data on a storage medium, such as film, a digital video disc (DVD), a compact disc (CD), a read only memory (ROM), a random access memory (RAM), magnetic media, etc. The hidden message of the "embedded watermark" is typically a copy control message, such as "do not copy" or "copy only once."

In the movie industry, the hidden message of the watermark may be an identifier of a particular location (e.g., theater) at which a movie is shown. If the management of the theater knowingly or unknowingly permits pirate to record the movie, the identity of that theater may be obtained by detecting the hidden message of the watermark embedded in a pirated copy of the movie. Corrective action may then be taken.

With respect to watermark detection, when a quantum of data comprising the content data and the embedded watermark is correlated with a reference watermark, a determination can be made as to whether the embedded watermark is substantially similar to, or the same as, the reference watermark. If a high correlation exists, then it may be assumed that the message of the embedded watermark corresponds to a message of the reference watermark. For example, the quantum of data may be a frame of data, such as video data, in which pixel data of the frame of video data has been embedded with a watermark ("the embedded watermark"). Assuming that the frame of data has not been distorted in some way, when a reference watermark that is substantially the same as the embedded watermark is correlated with the frame of video data, a relatively high output is obtained. This is so because a one-for-one correspondence (or registration) between the data of the embedded watermark and the data of the reference watermark will tend to increase a correlation computation. Conversely, if the embedded watermark contained in the frame of video data has been altered in a way that reduces the one-for-one correspondence between the embedded watermark and the reference watermark, the correlation will yield a relatively low result.

Often, the correlation computation involves performing a sum of products of the data contained in the frame of data and the data of the reference watermark. Assuming that the frame of data and the reference watermark include both positive values and negative values, the sum of products will be relatively high when the data of the embedded watermark aligns, one-for-one, with the data of the reference watermark. Conversely, the sum of products will be relatively low when the data of the embedded watermark does not align with the reference watermark.

A data detector, such as a standard correlation detector or matched filter, may be used to detect the presence of an embedded watermark in a frame of content data, such as video data, audio data, etc. The original or reference position of the embedded watermark is implicitly determined by the design of the hardware and/or software associated with the detector. These types of correlation detectors are dependent upon specific registration (i.e., alignment) of the embedded watermark and the reference watermark.

Pirates seeking to wrongfully copy content data containing an embedded watermark (e.g., one that proscribes copying via a hidden message: "do not copy") can bypass the embedded watermark by distorting the registration (or alignment) between the embedded watermark and the reference watermark. By way of example, a frame of content data containing an embedded watermark may be slightly rotated, resized, and/or translated from an expected position to a position that would prevent a one-for-one correspondence (perfect registration) between the embedded watermark and the reference watermark. Editing and copying equipment may be employed to achieve such distortion.

An embedded watermark contained in a pirated copy of a movie may also have been distorted. A pirate may intentionally distort the embedded watermark as discussed above or the distortion may unintentionally occur during the recording process at a theater. For example, if the pirated copy was recorded, using a video camera, several factors can cause distortion including (i) shaking of the video camera (especially if it is handheld); (ii) misalignment of the video camera with the projected movie (e.g., when the video camera is on a tripod); (iii) lens distortion in the video camera (intentional and/or non-intentional); and (iv) projection screen abnormalities (e.g., curvature).

Further, inadvertent distortion of the embedded watermark may occur during the normal processing of the content data (containing an embedded watermark) in a computer system or consumer device. For example, the content data (and embedded watermark) of a DVD may be inadvertently distorted while undergoing a formatting process, e.g., that converts the content data from the European PAL TV system to the US NTSC TV system, or vice versa. Alternatively, the content data and embedded watermark may be distorted through other types of formatting processes, such as changing the format from a wide-screen movie format to a television format. Indeed, such processing may inadvertently resize, rotate, and/or translate the content data and, by extension, the embedded watermark, rendering the embedded watermark difficult to detect.

Different types of watermark systems exist that purport to be robust to resizing and translation. One such type of watermark system typically embeds the watermark in a way that is mathematically invariant to resizing and translation. The detector used in this type of system does not have to adjust to changes in the position and/or size of the embedded watermark. Such a system is typically based on Fourier-Mellin transforms and log-polar coordinates. One drawback of such a system is that it requires complex mathematics and a particularly structured embedded watermark pattern and detector. This system cannot be used with pre-existing watermarking systems.

Another type of prior art watermark system uses repetitive watermark blocks, wherein all embedded watermark blocks are identical. The watermark block in this type of system is typically large and designed to carry the entire copy-control message. The repetition of the same block makes it possible to estimate any resizing of the embedded watermark by correlating different portions of the watermarked image and finding the spacing between certain positions. The resizing is then inverted and the reference block is correlated with the adjusted image to find the embedded watermark and its position simultaneously. An example of this system is the Philips VIVA/JAWS+ watermarking system. A disadvantage of such a system is that the design of the embedded watermark must be spatially periodic, which does not always occur in an arbitrary watermarking system.

Yet another type of watermarking system includes an embedded template or helper pattern along with the embedded watermark in the content data. The detector is designed to recognize the reference location, size and shape of the template. The detector attempts to detect the template and then uses the detected position of the template to estimate the actual location and size of the embedded watermark. The system then reverses any geometric alterations so that the correlation detector can detect and interpret the embedded watermark. This system is disadvantageous, however, since the templates tend to be fragile and easily attacked.

Accordingly, there is a need in the art for a new method and/or system for detecting an embedded watermark in one or more frames of data that is robust despite arbitrary distortion, e.g., rotation, resizing, translation, and/or deformations.

SUMMARY OF THE INVENTION

In accordance with one or more aspects of the invention, a method and/or apparatus is capable of detecting a watermark among a plurality of reproduced frames of data, the reproduced frames of data having been derived from respective original frames of data includes: adding at least some of the reproduced frames of data together on a data point-by-data point basis to obtain an aggregate frame of data points; selecting peak data points of the aggregate frame of data points; computing correction information from deviations between the positions of the peak data points within the aggregate frame and expected positions of those peak data points; modifying positions of at least some of the data of at least some of the reproduced frames of data using the correction information such that those reproduced frames of data more closely coincide with respective ones of the original frames of data; and detecting the watermark from among the modified reproduced frames of data.

The marker data points within each of the original frames of data are located at substantially the same relative positions and the reproduced marker data points within each of the reproduced frames of data are located at substantially the same relative positions. Preferably, the set of marker data points are arranged in a grid. Each peak data point of the aggregate frame of data points corresponds to a sum of the reproduced marker data points that are located at substantially the same relative position within respective ones of at least some of the M reproduced frames of data. The expected positions of the peak data points within the aggregate frame of data points are the corresponding positions of the marker data points within the original frames of data.

Preferably, the method and/or apparatus further includes: grouping the peak data points and their associated reproduced marker data points and marker data points into respective sets of three or more; comparing the respective positions of the peak data points of each set with the positions of the associated set of marker data points; computing respective sets of correction information based on the comparison of the sets of peak data points and marker data points, each set of correction information corresponding to a respective area within each of the reproduced frames of data circumscribed by the reproduced marker data points associated with the peak data points of the set of correction information; and modifying the positions of the data in each of the respective areas of at least one of the reproduced frames of data in accordance with the associated sets of correction information.

In accordance with at least one further aspect of the present invention, a method and/or apparatus is capable of detecting a watermark among a plurality of reproduced frames of data, the reproduced frames of data having been derived from respective original frames of data, N of the reproduced frames of data each including a plurality of reproduced blocks of noise data corresponding with blocks of noise data distributed within N of the original frames of data. The method and/or apparatus includes: deriving peak data points from the reproduced blocks of noise data of the N reproduced frames of data, the peak data points being positioned within an aggregate frame of data points; computing correction information from deviations between the positions of the peak data points within the aggregate frame and expected positions of those peak data points; modifying positions of at least some of the data of at least some of the reproduced frames of data using the correction information such that those reproduced frames of data more closely coincide with respective ones of the original frames of data; and detecting the watermark from among the modified reproduced frames of data.

The step of deriving the peak data points preferably includes: selecting one of the noise data of one of the blocks of noise data of an i-th one of the N frames of the original frames of data, where $i=1, 2, \ldots N$; multiplying the data of an i-th one of the N frames of the reproduced frames of data by the selected one of the noise data to produce an i-th modified reproduced frame of data; and summing the modified reproduced frames of data on a point-by-point basis to obtain the aggregate frame of data points, wherein the peak data points are those having substantially higher magnitudes than other data points of the aggregate frame of data.

The method preferably further includes: grouping into respective sets of three or more: (i) the peak data points, (ii) the reproduced data points of the N reproduced frames of data at relative positions corresponding to the peak data points, and (iii) the associated selected noise data points; comparing the respective positions of the peak data points of each set with the positions of the associated set of selected noise data points; computing respective sets of correction information based on the comparison of the sets of peak data points and noise data points, each set of correction information corresponding to a respective area within each of the reproduced frames of data circumscribed by the reproduced data points of the N reproduced frames of data at relative positions corresponding to the peak data points; and modifying the positions of the data in each of the respective areas of at least one of the reproduced frames of data in accordance with the associated sets of correction information.

Other advantages, features and aspects of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

FIG. 3 is a graphical illustration of some additional details of the watermark of FIG. 2;

FIG. 4 is a graphical illustration of further details of the watermark of FIG. 2;

FIG. 8 is a graphical illustration of an example of detecting a watermark in a frame of data;

DETAILED DESCRIPTION

Figure 1:
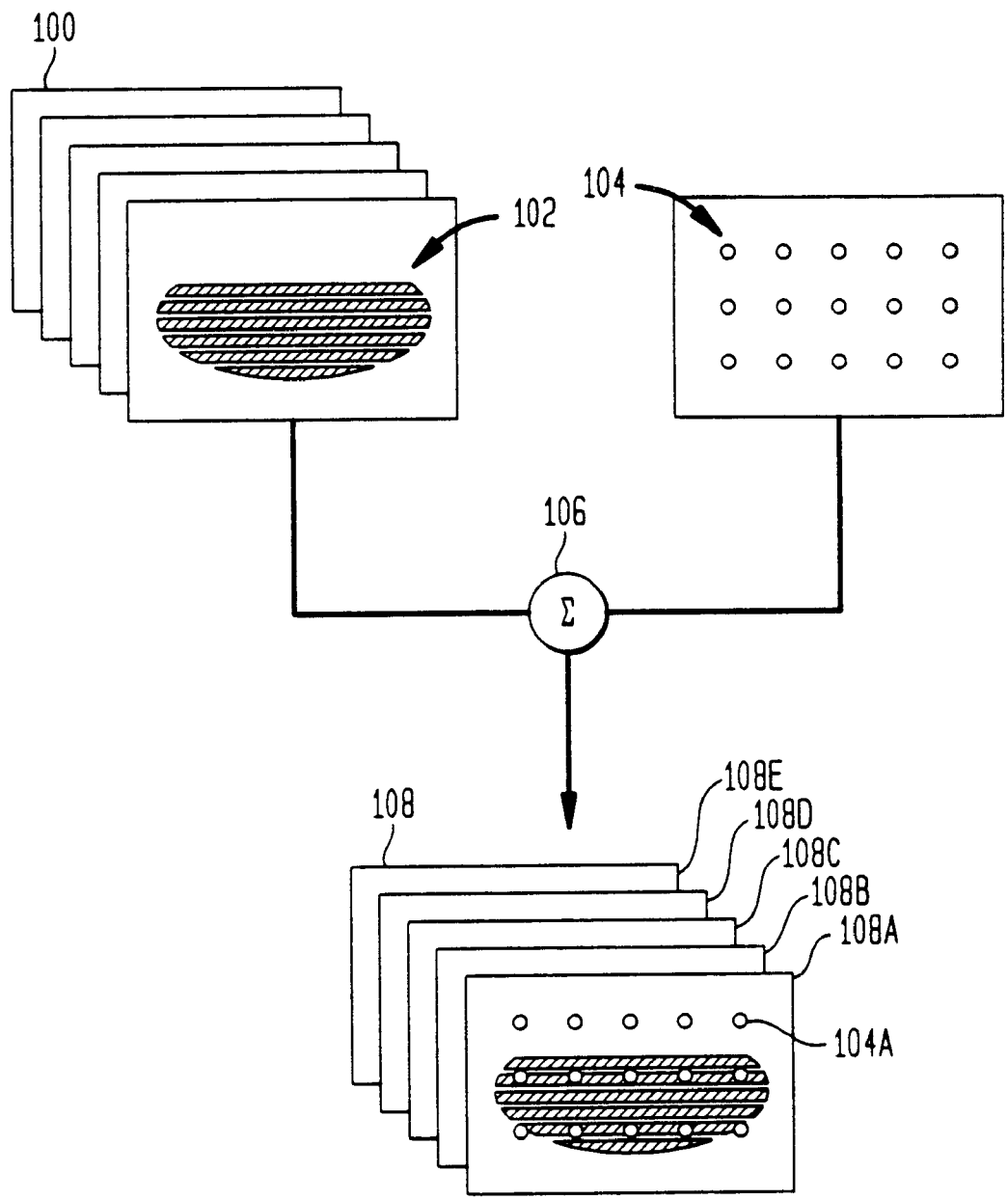
FIG. 1 is a conceptual block diagram illustrating an example of embedding marker data points into one or more frames of data in accordance with one or more aspects of the present invention.

Referring now to the drawings wherein like numerals indicate like elements, there is shown in FIG. 1 a conceptual block diagram illustrating the use of marker data points in accordance with one or more aspects of the present invention.

An "original movie" to be shown in a theater includes many frames of data. Prior to distribution of the movie to a particular theater, a plurality of frames of data 100 containing content data 102 are preferably modified to include a number of marker data points 104, preferably arranged in a grid. In particular, the pattern of marker data points 104 are preferably embedded into at least some of the frames of data 100, for example, by way of a summing unit 106. The output of the summing unit 106 is a plurality of frames of data 108, each containing the pattern of marker data points 104 as well as the content data 102. The frames of data 108 may represent substantially all of the frames of data of the movie or may be a subset of such frames of data, for example, N frames of data. The frames of data 108 may be referred to herein as "original frames of data" 108 because they are intended to represent the physical media (i.e., movie film) that is used by a theater to project a movie onto a projection screen.

A given marker data point 104 is preferably located at a single point within a frame of data 108, for example, at a single pixel location. It is understood, however, that practical limitations may require that a given marker data point 104 covers two or more data locations (e.g., pixel locations). Preferably, the marker data points 104 within each of the N frames of data 108 are located at substantially the same relative positions. In other words, if an original frame of data 108A contains an embedded marker data point 104A at a particular position within the frame, then another original frame of data 108B preferably also includes an embedded marker data point 104B (not shown) at substantially the same relative position as marker data point 104A within that frame. This arrangement preferably applies with respect to substantially all of the marker data points 104 and substantially all of the N original frames of data 108.

One or more of the original frames of data 108 preferably also include an embedded watermark containing a hidden message, for example, an identifier of the theater at which the original frames of data 108 (i.e., the movie) are to be shown.

Figure 2:
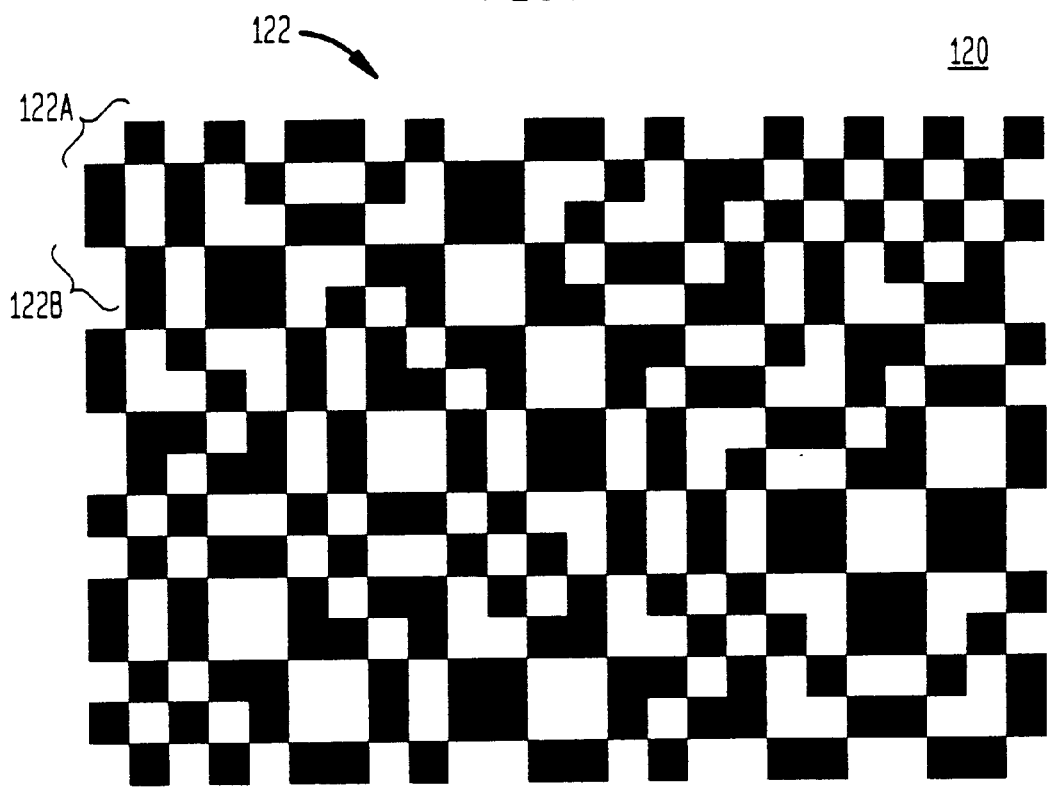
FIG. 2 is a graphical illustration of a preferred block based watermark suitable for use with the present invention.

Referring to FIG. 2, a general block-based structure of a preferred watermark 120 in accordance with at least one aspect of the present invention is shown. The data of the watermark 120 may be embedded in the content data 102, in which case the watermark 120 is referred to herein as an "embedded watermark" 120. It is noted, however, that the watermark 120 may represent a desired configuration for a watermark embedded in a frame of data (e.g., having not been distorted), in which case the watermark 120 would be referred to herein as a "reference watermark" 120.

Preferably, the watermark 120 includes a plurality of data blocks 122, each data block 122 having an array of data values (such as pixel values, etc.). The array of each data block 122 is preferably a square array, although a non-square array may also be employed without departing from the scope of the invention. The data values of each data block 122 are arranged in one of a plurality of patterns. As shown, the data blocks 122 of the watermark 120 preferably include data values arranged in either a first pattern or a second pattern. For example, data block 122A may be of the first pattern and data block 122B may be of the second pattern.

Reference is now made to FIG. 3, which illustrates further details of a data block 122 of the first pattern, such as data block 122A. Assuming a Cartesian system of coordinates, the first pattern may be defined by four quadrants of data values, where the first and third quadrants have equal data values and the second and fourth quadrants have equal data values. By way of example, the data values of the first and third quadrants may represent negative magnitudes (e.g., −1) and are shown as black areas in FIG. 2, while the data values of the second and fourth quadrants may represent positive magnitudes (e.g., +1) and are shown as white areas in FIG. 2. With reference to FIG. 4, the second pattern (e.g.. data block 122B) may also be defined by four quadrants of data values, where the first and third quadrants have equal data values and the second and fourth quadrants have equal data values. In contrast to the first pattern, however, the data values of the first and third quadrants of the second pattern may represent positive magnitudes (white areas in FIG. 2), while the data values of the second and fourth quadrants may represent negative magnitudes (black areas in FIG. 2).

One of the first and second patterns of data values, for example the first pattern (e.g., data block 122A), preferably represents a logic state, such as one, while the other pattern, for example the second pattern (e.g., data block 122B), represents another logic state, such as zero. The array of data blocks 122 of the watermark 120 therefore may represent a pattern of logic states (e.g., ones and zeros) defining the hidden message in the frame of data.

Notably, the data values of the first pattern and the data values of the second pattern consist of two opposite polarity magnitudes (e.g., +1 and −1) such that a sum of products of the data values of a data block 122 having the first pattern (e.g., 122A) and a data block 122 having the second pattern (e.g., 122B) is a peak number, either positive or negative, although in the example herein, the sum of magnitudes is a peak negative number (because the products of the data values are all −1). In keeping with the example above, a sum of products of the data values of a data block 122 having the first pattern (122A) and a data block 122 having the second pattern (122B) is a peak positive number when one of the data blocks 122A, 122B is rotated by 90° with respect to the other data block. This is so because the products of the data values are all +1 when one of the data blocks 122A, 122B is rotated by 90°. As will be apparent to one skilled in the art from the discussion below, these properties of the watermark 120 enable improved accuracy in the detection of an embedded watermark in a frame of data, even when the embedded watermark has been "geometrically" altered in some way e.g., rotated, resized, translated, etc.

It is noted that the basic structure of the watermark 120 is given by way of example only and that many variations and modifications may be made to it without departing from the scope of the invention. For robustness, it is preferred that the watermark 120 be formed by blocks of data, e.g., data blocks 122, that exhibit certain properties. For example, it is preferred that each data block 122 contain values that are substantially equal (e.g., constant) along any radius from a center of the data block 122 to its boundary (or perimeter). For example, the data blocks 122A and 122B of FIGS. 3 and 4 are either +1 or −1 along any such radius. As will be apparent from the disclosure herein, this ensures robustness in detecting an embedded watermark despite resizing (e.g., increasing magnification, decreased magnification, changes in aspect ratio, etc.).

Any of the known processes may be employed to embed the watermark 120 of FIG. 2 into one or more frames of content data, such as the frames of data 100 of FIG. 1. In general, a basic embedder (such as the summing unit 106, FIG. 1) may be employed to aggregate (e.g., add) the data of the watermark 120 to the data of the one or more frames of data 100 on a point-by-point basis to obtain one or more original frames of data 108 that include the content data and the embedded watermark 120.

Figure 5:
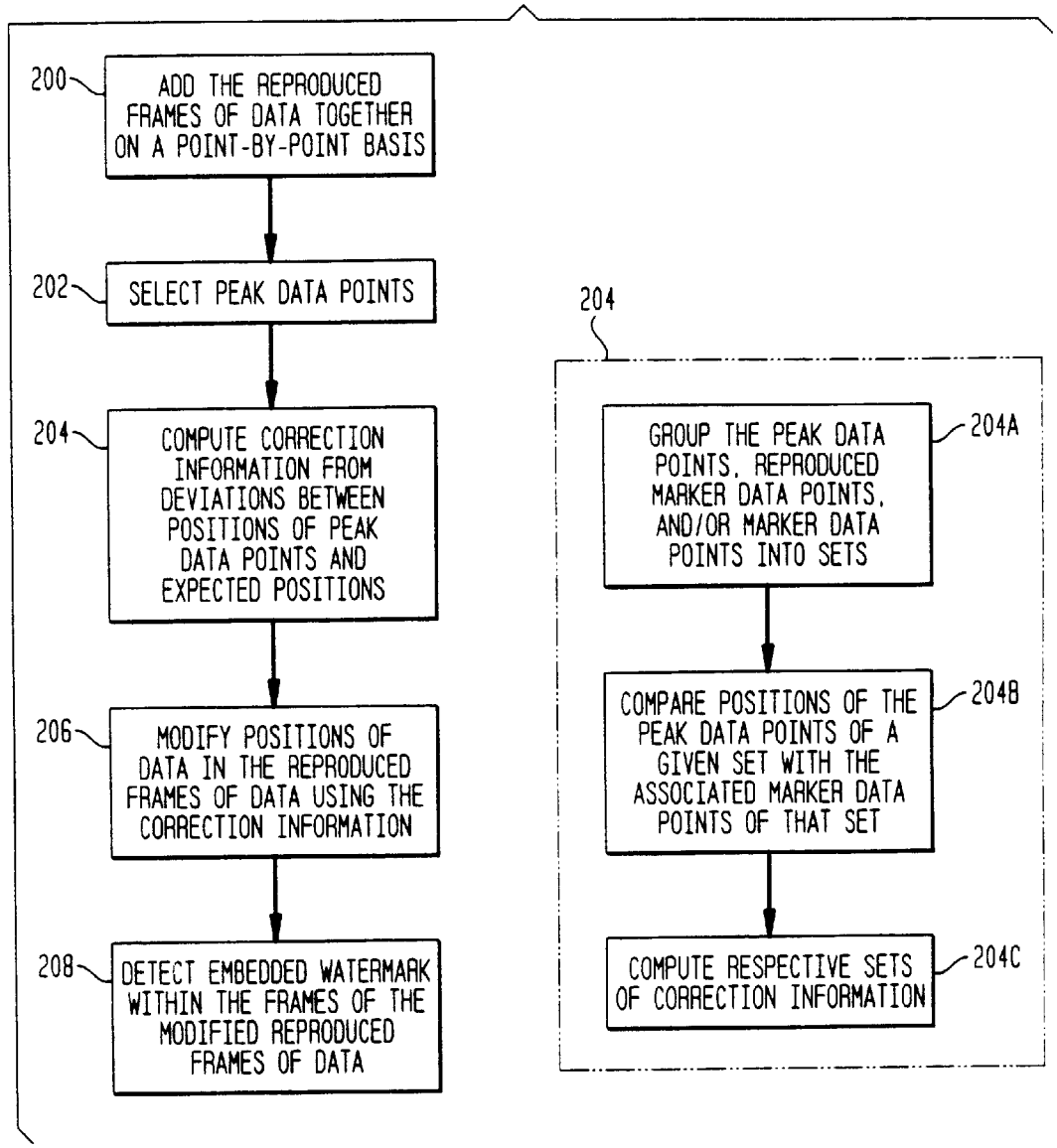
FIG. 5 is a flow diagram illustrating certain actions and/or functions in accordance with one or more aspects of the present invention.
Figure 6:
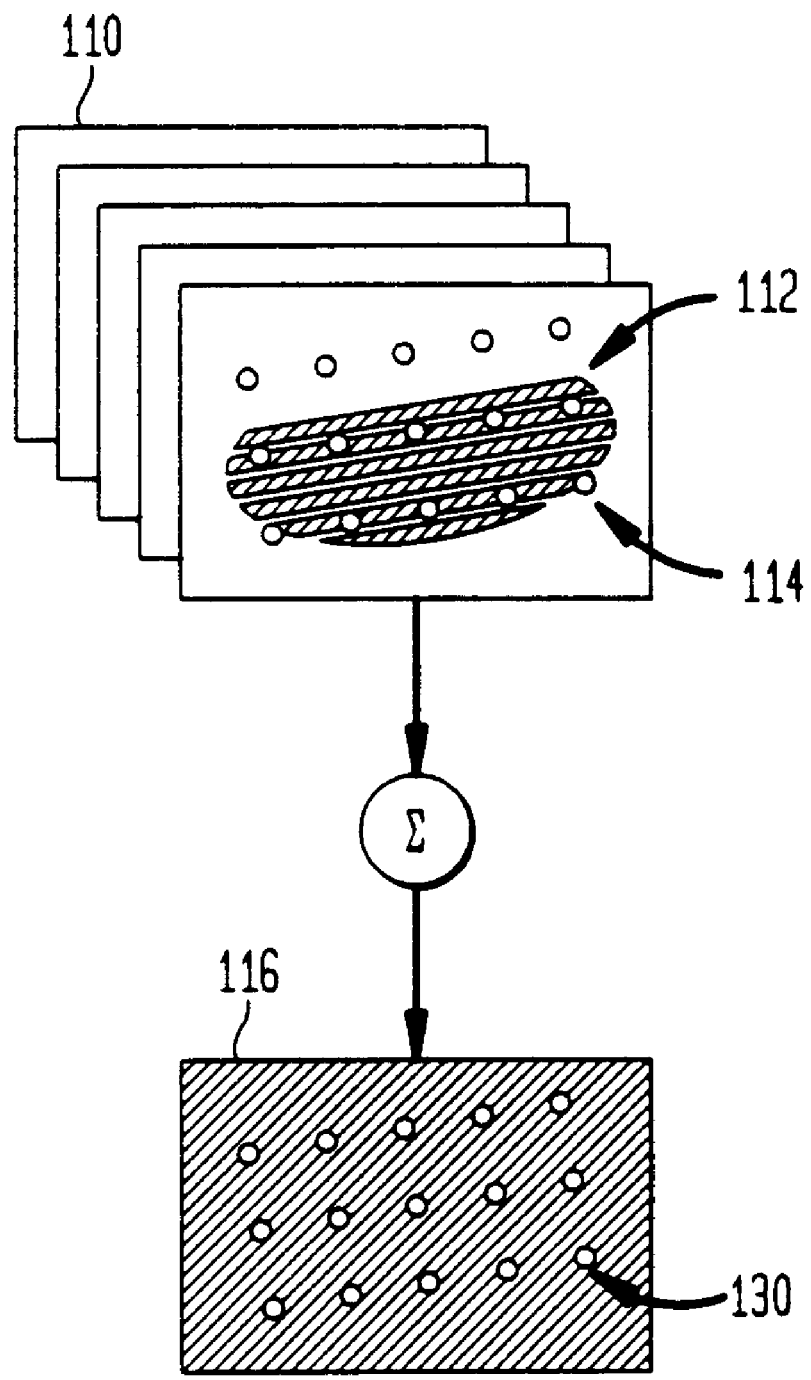
FIG. 6 is a conceptual block diagram illustrating the detection of reproduced marker data points contained in one or more reproduced frames of data in accordance with one or more aspects of the present invention.

Reference is now made to FIG. 5, which is a flow diagram illustrating certain actions and/or functions that are preferably carried out in accordance with one or more aspects of the present invention. By way of introduction, and with further reference to FIGS. 1 and 6, the original frames of data 108 are assumed to have been reproduced in some way, for example, recorded using a video camera. A plurality of reproduced frames of data 110 (e.g., M frames of data) are shown in FIG. 6. Each reproduced frame of data 110 corresponds with one of the original frames of data 108 and includes reproduced content data 112 and reproduced marker data points 114. Each reproduced marker data point 114 of a given one of the reproduced frames of data 110 corresponds with one of the marker data points 104 of a corresponding one of the original frames of data 108. Thus, just as the marker data points 104 within each of the N original frames of data are located at substantially the same relative positions, the reproduced marker data points 114 within each of the M reproduced frames of data 110 are likewise located at substantially the same relative positions.

The reproduced content data 112, the reproduced marker data points 114, and the embedded watermark 120 may have been subject to various types of distortion during or after the pirating process. By way of example, the content 102 and the marker data points 104 from the original frames of data 108 may have been slightly rotated within each reproduced frame of data 110 as compared to the original frames of data 108. This rotation may be due to, for example, misalignment of the video camera with respect to the projection screen in the theater when the reproduced frames of data 110 were pirated.

Turning again to FIG. 5, at action 200, reproduced frames of data are added together on a point-by-point basis. It is preferred that all of the reproduced frames of data 110 that correspond with the N original frames of data 108 containing marker data points 104 are added together to produce an aggregate frame of data points 116. It is understood, however, that all of the reproduced frames of data 110 need not be added together; indeed, a subset of the reproduced frames of data 110 that contain reproduced marker data points 114 may be added together on a point-by-point basis to obtain the aggregate frame data points 116.

It is assumed that whatever distortion was introduced into the reproduced frames of data 110 during the pirating process is substantially consistent from frame to frame. Consequently, the summation of the reproduced frames of data 110 containing the reproduced marker data points 114 will tend to cause peak data points 130 to appear in the aggregate frame of data points 116. These peak data points 130 should appear substantially at the locations of the reproduced marker data points 114 within the reproduced frames of data 110. This is so because each peak data point 130 of the aggregate frame of data points 116 corresponds to a sum of the reproduced marker data points 114 that are located at substantially the same relative position within respective ones of the reproduced frames of data 110. Other data points within the aggregate frame of data points 116 will likely be of significantly lower magnitude because the reproduced content data 112 will likely average out over the summation of the reproduced frames of data 110.

At action 202, the peak data points 130 are preferably selected (or identified) from among the other data points within the aggregate frame of data points 116. It is noted that the distortion introduced either intentionally or unintentionally during the pirating process is reflected in the positions of the peak data points 130 within the aggregate frame of data points 116.

Figure 7A:
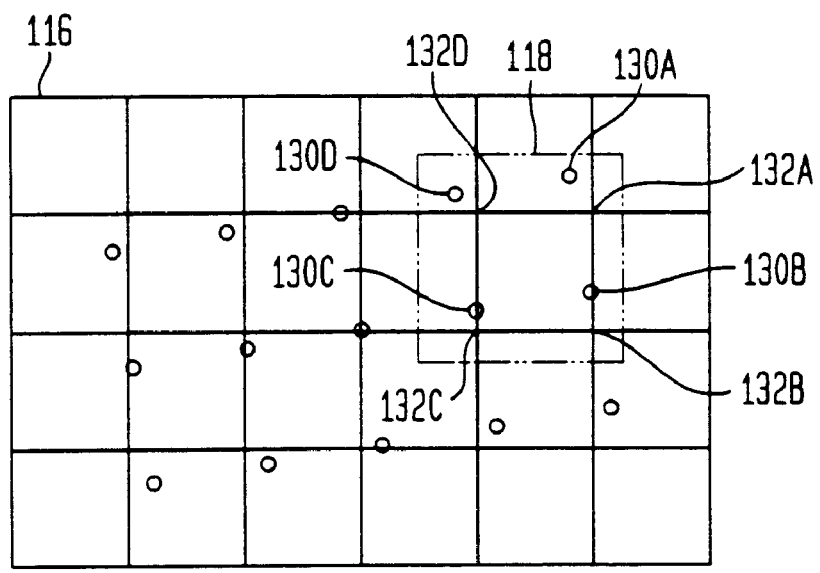
FIGS. 7A and 7B are conceptual diagrams illustrating how the reproduced marker data points of FIG. 6 may be utilized to modify the reproduced frames of data in accordance with one or more aspects of the present invention.

With reference to FIG. 7A, the aggregate frame of data points 116 of FIG. 6 is shown superimposed on a grid, where the intersection points of the grid are the expected positions of the peak data points 130 within the aggregate frame of data points 116 (i.e., assuming that no distortion has taken place). Indeed, the intersection points coincide with the relative positions of the marker data points 104 contained in the original frames of data 108 (FIG. 1). As is clear from FIG. 7A, the distortion in the reproduced frames of data 110 has caused the reproduced marker data points 114 to move from their expected positions to other positions and, therefore, the peak data points 130 are likewise out of their expected position.

At action 204 (FIG. 5), correction information is preferably computed from deviations between the positions of the peak data points 130 and their expected positions (i.e., the intersection points of the grid lines—which is to say the corresponding positions of the marker data points 104 within the N original frames of data). Any of the known techniques for computing the correction information may be utilized without departing from the scope of the invention. For example, the well known bilinear interpolation technique may be employed. Additional details concerning this technique may be found in U.S. Pat. No. 6,285,804, the entire disclosure of which is hereby incorporated by reference.

It is most preferred that the peak data points 130 are grouped into sets of three or more (action 204A), for example, into sets of four, one set 118 being shown in FIG. 7A. It is noted that this grouping preferably results in corresponding groupings of the reproduced marker data points 114 and/or the marker data points 104 of the original frames of data 108. At action 204B comparisons of the positions of the peak data points 130 of each set (e.g., set 118) are made with respect to the associated marker data points 104 of those sets. For example, the position of peak data point 130A of set 118 is preferably compared with the relative position of the associated marker data point 104 (i.e., the expected position 132A). The position of peak data point 130B of set 118 is preferably compared with the position of the associated marker data point 104 (i.e., the expected position 132B). Similar comparisons are made for peak data points 130C and 130D. A set of correction information is preferably computed for set 118 that defines the deviations in the positions of the peak data points 130 and the expected positions of those data points within the set (action 204C).

Figure 7B:
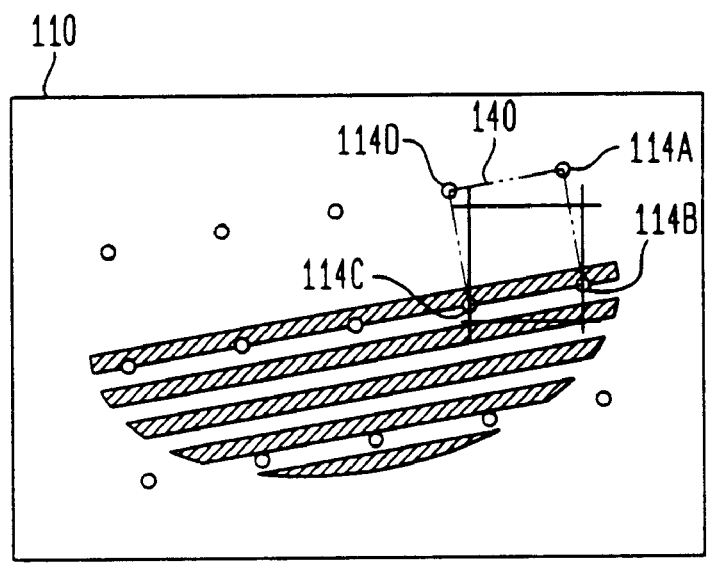

At action 206, the positions of at least some of the data of at least some of the reproduced frames of data 110 are modified using the correction information such that those reproduced frames of data more closely coincide or match with respective ones of the original frames of data 108. For example, with reference to FIG. 7B the set of correction information of set 118 corresponds to a respective area 140 within each of the reproduced frames of data 110. The respective area 140 is that area circumscribed by the reproduced marker data points 114 associated with the peak data points 130 of the set of correction information. More particularly, the area 140 is circumscribed by the reproduced marker data points 114A, 114B, 114C, and 114D. These reproduced marker data points are associated with the peak data points 130A, 130B, 130C, and 130D within set 118 of FIG. 7A. The positions of the data in area 140 are preferably modified in accordance with the set of correction information corresponding to area 140. Similar modifications are preferably made with respect to other sets of correction information and associated areas of the reproduced frames of data 110. It is noted that the correction information applies to all of the reproduced frames of data 110, not only those containing marker data points 114. This is so because it is assumed that the distortion is consistent from frame to frame among the reproduced frames of data 110.

At action 208 (FIG. 5), the embedded watermark 120 within the modified reproduced frames of data is preferably detected using any of the known techniques. In accordance with the invention, the detection of the embedded watermark 120 is advantageously more successful at least because the distortion introduced into the reproduced frames of data 110 has been substantially corrected in the modified reproduced frames of data.

Reference is now made to FIG. 8, which is a graphical block diagram illustrating an example of how an embedded watermark 120A contained in one or more frames of data may be detected. In this example, detection is obtained by computing a correlation with respect to a reference watermark 120. It is understood that the embedded watermark 120A is shown without the accompanying content data 112 for the purposes of discussion. It is noted that the embedded watermark 120A exhibits little or no distortion with respect to its expected position due to the modification process 206 (FIG. 5). Thus, the alignment between (or registration of) the embedded watermark 120A and the reference watermark 120 is ideally exact. The contribution by the data values of the embedded watermark 120A to the product of the data values (i.e., pixel values) of the modified reproduced frame of data and the corresponding data values of the reference watermark 120 will be maximized (e.g., shown as a frame of white points 150). The sum of the products of 150 is substantially high when such alignment exists. Detection is thus complete.

Figure 9:
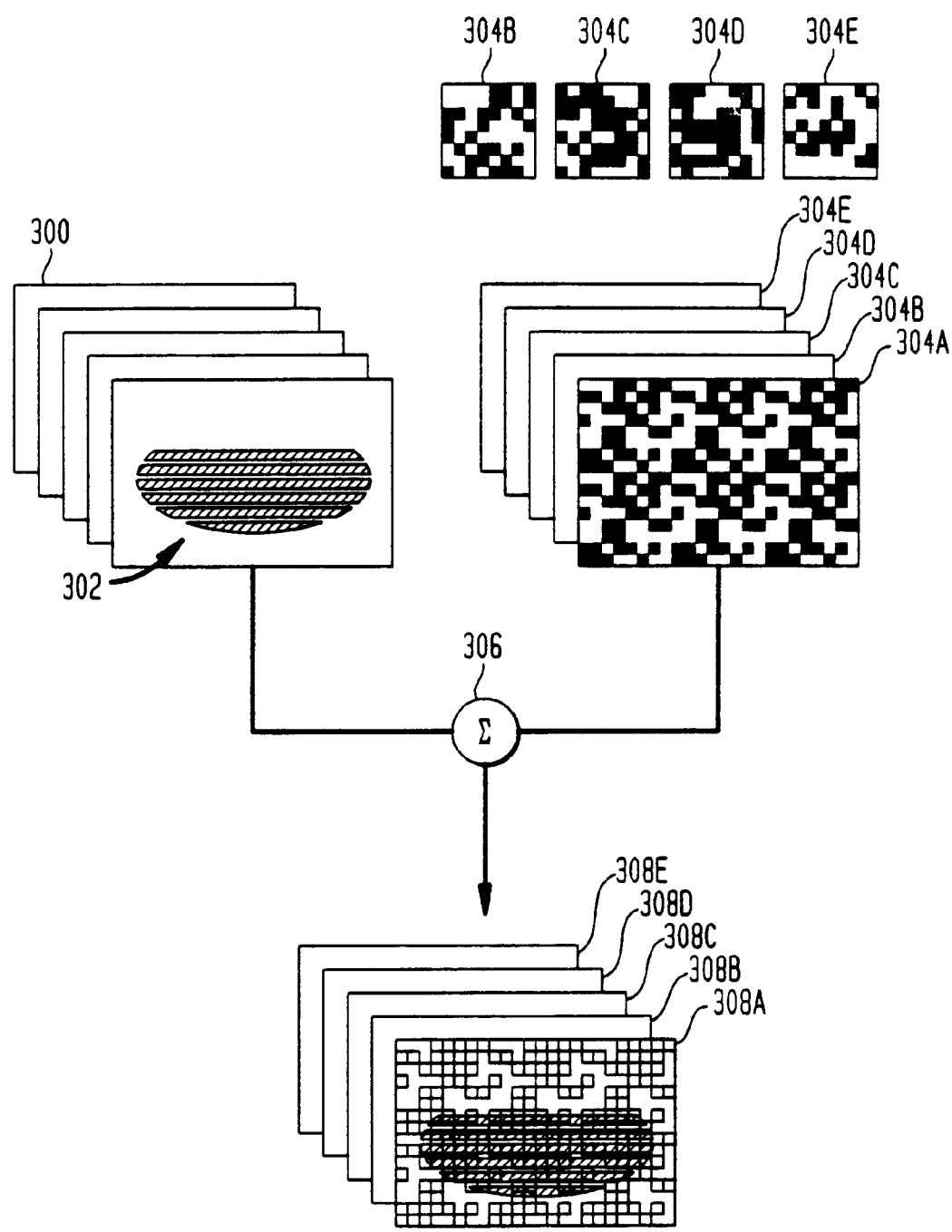
FIG. 9 is a conceptual block diagram illustrating the use of noise blocks with one or more frames of data in accordance with one or more further aspects of the present invention.

Reference is now made to FIG. 9, which is a conceptual diagram illustrating the use of blocks of noise data as opposed to marker data points in the original frames of data. As shown, at least one of the frames of data 300 (which may include content data 302) is aggregated with a plurality of blocks of noise data 304. The summing unit 306 may be employed to perform the aggregation function. The output of the summing unit 306 is preferably N original frames of data 308, where each frame 308 includes the blocks of noise data 304 distributed therewithin.

All of the blocks of noise data 304 within a given one of the N original frames of data 308 are preferably substantial replicas of one another. Although all of the N original frames of data 308 may contain the same blocks of noise data 304, it is preferred that different ones of the N original frames of data 308 contain blocks of noise data 304 that are substantially different from one another. For example, one of the N original frames of data 308A may include blocks of noise data 304A, while another of the N original frames of data 308B preferably includes a plurality of blocks of noise data 304B that are different from blocks of noise data 304A. Similarly, other ones of the N original frames of data 308C, 308D, 308E, etc. preferably contain respective blocks of noise data, such as 304C, 304D, 304E, etc. that are substantially different from one another.

It is preferred that each of the blocks of noise data 304, irrespective of which of the N original frames of data 308 contains it, is of substantially the same size and configuration. For the purposes of discussion, 8×8 blocks of noise data 304 are illustrated, although any other size and/or configuration may be employed without departing from the scope of the invention. The blocks of noise data 304 of each of the N original frames of data 308 are preferably located at substantially the same relative positions within each frame 308. In other words, from frame to frame, the blocks of noise data 304 preferably align with one another in terms of their overall perimeters and data points. The magnitudes of the data points, however, may be different from frame to frame at the same relative position when different blocks of noise data 304 are used in different frames 308. It is preferred that a given data point of a block of noise data 304 is of a size that corresponds with the size of the data points of the content data 302. For example, if a data point of the content data 302 is a single pixel, then the size of the data points of the blocks of noise data 304 are preferably also on the order of a single pixel. Practical constraints, however, may dictate that a data point of the blocks of noise data 304 have a size corresponding to two or more pixels.

Figure 10:
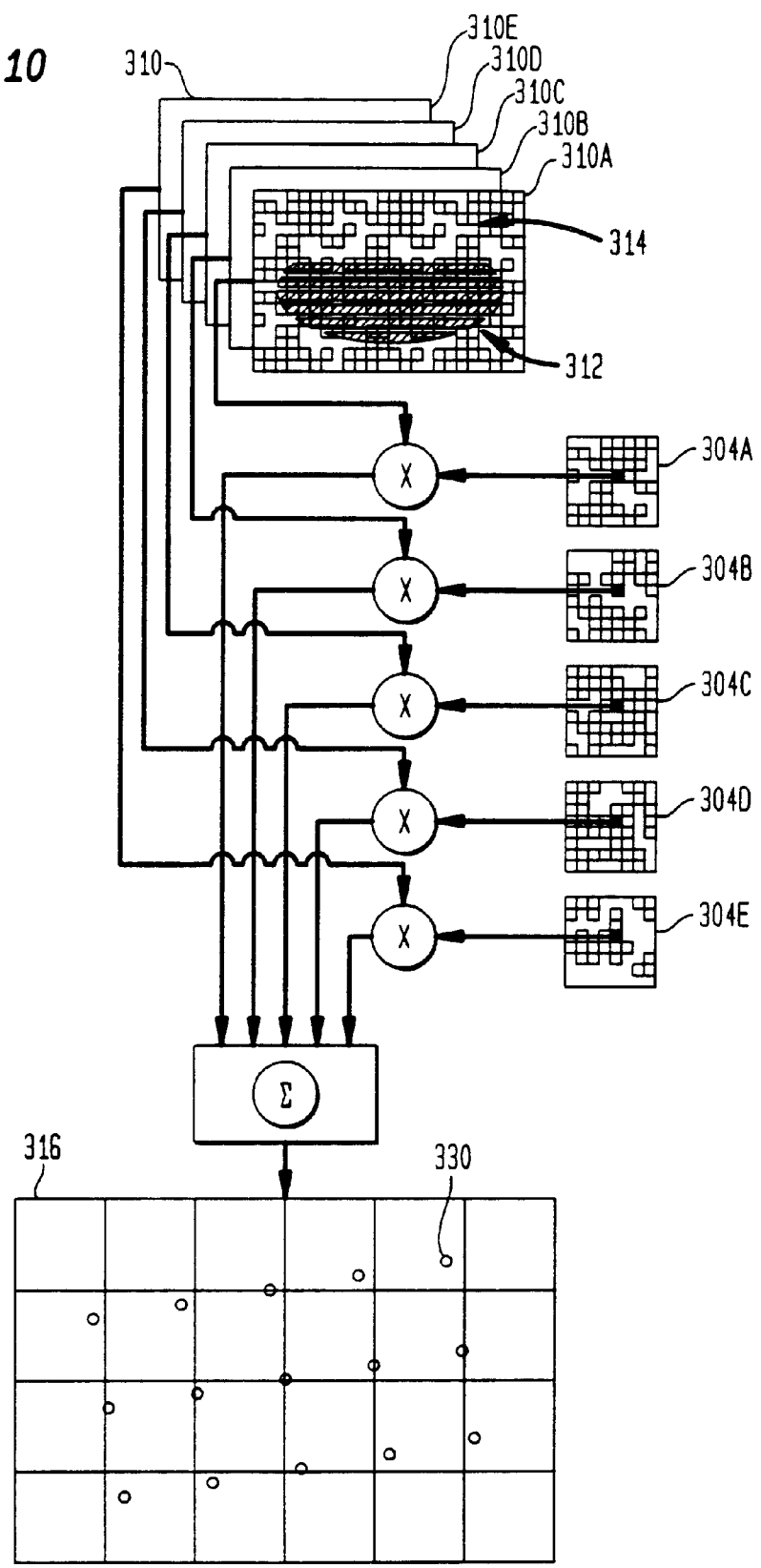
FIG. 10 is a conceptual diagram illustrating how the noise blocks of FIG. 9 may be utilized to derive marker data points in reproduced frames of data in accordance with one or more further aspects of the present invention.

Reference is now made to FIG. 10, which is a conceptual block diagram of a process or system for deriving an aggregate frame of data points 316 from M reproduced frames of data 310. Each of the reproduced frames of data 310 includes reproduced content data 312 and reproduced blocks of noise data 314. The content data 312 and the reproduced blocks of noise data 314 may have been distorted during the process of pirating the original frames of data 308. Assuming that one of the reproduced frames of data 310A corresponds with original frame of data 308A, the block of noise data 304A is used to modify the reproduced frame of data 310A. In particular, one of the data points of the block of noise data 304A is selected and its magnitude is used to multiply substantially all of the data points of the reproduced frame of data 310A. Assuming that another one of the reproduced frames of data 310B corresponds with original frame of data 308B, the block of noise data 304B is used to modify the reproduced frame of data 310B. Indeed, one of the data points of the block of noise data 304B is selected and its magnitude is used to multiply substantially all of the data points of the reproduced frame of data 310B. This process is repeated for the other reproduced frames of data 310C, 310D, 310E, etc. and the associated blocks of noise data 304C, 304D, 304E, etc.

The modified reproduced frames of data are summed on a point-by-point basis to obtain an aggregate frame of data points 316. This process may be stated in general as follows: (i) selecting an i-th one of the noise data of one of the blocks of noise data 304 of an i-th one of the N original frames of data 308, where i=1, 2, ... N; (ii) multiplying the data of an i-th one of the M reproduced frames of data 310 by the selected one of the noise data to produce an i-th modified reproduced frame of data; and (iii) summing the modified reproduced frames of data on a point-by-point basis to obtain the aggregate frame of data points 316.

When each of the i-th noise data are selected from substantially the same relative positions within the corresponding i-th original frame of data 308 (or substantially the same relative positions within the blocks of noise data 304 of the corresponding i-th original frame of data 308), then the summation of the modified reproduced frames of data will yield peak data points 330 within the aggregate frame of data points 316 at positions that correspond with the selected i-th noise data subject to the distortion. Thus, the peak data points 330 within the aggregate frame of data points 316 provide substantially the same information as the peak data points 130 of the aggregate frame of data points 116 of FIG. 7A. Therefore, the actions and/or functions 202–208 shown in FIG. 5 may be employed to modify the reproduced frames of data 310 and detect the embedded watermark.

In accordance with at least one further aspect of the present invention, a method and/or apparatus for detecting a watermark among a plurality of reproduced frames of data is contemplated. The method and/or apparatus may be achieved utilizing suitable hardware capable of carrying out the actions and/or functions discussed hereinabove with respect to FIGS. 1–10. Alternatively, the method and/or apparatus may be achieved utilizing any of the known processors that are operable to execute instructions of a software program. In the latter case, the software program preferably causes the processor (and/or any peripheral systems) to execute the actions and/or functions described hereinabove. Still further, the software program may be stored on a suitable storage medium (such as a floppy disk, a memory chip, etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of detecting a watermark among a plurality of reproduced frames of data, the reproduced frames of data having been derived from respective original frames of data, the method comprising:

adding at least some of the reproduced frames of data together on a data point-by-data point basis to obtain an aggregate frame of data points;

selecting peak data points of the aggregate frame of data points; and computing correction information from deviations between the positions of the peak data points within the aggregate frame and expected positions of those peak data points.

2. The method of claim 1, wherein each of N of the original frames of data include marker data points and each of M of the reproduced frames of data include reproduced marker data points; each reproduced marker data point of a given one of the reproduced frames of data corresponds with one of the marker data points of a corresponding one of the original frames of data; N is an integer less than or equal to a total number of the original frames of data; and M is an integer less than or equal to a total number of the reproduced frames of data.

3. The method of claim 2, wherein:

the marker data points within each of the N original frames of data are located at substantially the same relative positions; and the reproduced marker data points within each of the M reproduced frames of data are located at substantially the same relative positions.

4. The method of claim 3, wherein the set of marker data points are arranged in a grid.

5. The method of claim 3, wherein each peak data point of the aggregate frame of data points corresponds to a sum of the reproduced marker data points that are located at substantially the same relative position within respective ones of at least some of the M reproduced frames of data.

6. The method of claim 5, wherein the expected positions of the peak data points within the aggregate frame of data points are the corresponding positions of the marker data points within the N original frames of data.

7. The method of claim 6, further comprising:

grouping the peak data points and their associated reproduced marker data points and marker data points into respective sets of three or more;

comparing the respective positions of the peak data points of each set with the positions of the associated set of marker data points;

computing respective sets of correction information based on the comparison of the sets of peak data points and marker data points, each set of correction information corresponding to a respective area within each of the reproduced frames of data circumscribed by the reproduced marker data points associated with the peak data points of the set of correction information; and modifying the positions of the data in each of the respective areas of at least one of the reproduced frames of data in accordance with the associated sets of correction information.

8. The method of claim 1, wherein a given data point of the aggregate frame of data points is selected if its magnitude exceeds a threshold.

9. The method of claim 1, wherein the step of determining deviations between the positions of the peak data points within the aggregate frame and the expected positions of those peak data points includes using bilinear interpolation.

10. The method of claim 1, further comprising: modifying at least some of the reproduced frames of data using the correction information; and detecting the watermark from among the modified reproduced frames of data.

11. An apparatus for detecting a watermark among a plurality of reproduced frames of data, the reproduced frames of data having been derived from respective original frames of data, the apparatus comprising:

means for adding at least some of the reproduced frames of data together on a data point-by-data point basis to obtain an aggregate frame of data points;

means for selecting peak data points of the aggregate frame of data points; and means for computing correction information from deviations between the positions of the peak data points within the aggregate frame and expected positions of those peak data points.

12. The apparatus of claim 11, wherein each of N of the original frames of data include marker data points and each of M of the reproduced frames of data include reproduced marker data points; each reproduced marker data point of a given one of the reproduced frames of data corresponds with one of the marker data points of a corresponding one of the original frames of data; N is an integer less than or equal to a total number of the original frames of data; and M is an integer less than or equal to a total number of the reproduced frames of data.

13. The apparatus of claim 12, wherein:

the marker data points within each of the N original frames of data are located at substantially the same relative positions; and the reproduced marker data points within each of the M reproduced frames of data are located at substantially the same relative positions.

14. The apparatus of claim 13, wherein the set of marker data points are arranged in a grid.

15. The apparatus of claim 13, wherein each peak data point of the aggregate frame of data points corresponds to a sum of the reproduced marker data points that are located at substantially the same relative position within respective ones of at least some of the M reproduced frames of data.

16. The apparatus of claim 15, wherein the expected positions of the peak data points within the aggregate frame of data points are the corresponding positions of the marker data points within the N original frames of data.

17. The apparatus of claim 16, further comprising:

means for grouping the peak data points and their associated reproduced marker data points and marker data points into respective sets of three or more;

means for comparing the respective positions of the peak data points of each set with the positions of the associated set of marker data points;

means for computing respective sets of correction information based on the comparison of the sets of peak data points and marker data points, each set of correction information corresponding to a respective area within each of the reproduced frames of data circumscribed by the reproduced marker data points associated with the peak data points of the set of correction information; and means for modifying the positions of the data in each of the respective areas of at least one of the reproduced frames of data in accordance with the associated sets of correction information.

18. The apparatus of claim 11, wherein a given data point of the aggregate frame of data points is selected if its magnitude exceeds a threshold.

19. The apparatus of claim 11, wherein the step of determining deviations between the positions of the peak data points within the aggregate frame and the expected positions of those peak data points includes using bilinear interpolation.

20. The apparatus of claim 12, further comprising: means for modifying at least some of the reproduced frames of data using the correction information; and means for detecting the watermark from among the modified reproduced frames of data.

* * * * *